United States Patent
Chen et al.

(10) Patent No.: US 10,295,682 B2
(45) Date of Patent: May 21, 2019

(54) VIBRATION DETECTION DEVICE AND METHOD

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Hsiu-Chiang Liang, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 223 days.

(21) Appl. No.: 15/413,650

(22) Filed: Jan. 24, 2017

(65) Prior Publication Data

US 2018/0003833 A1    Jan. 4, 2018

(30) Foreign Application Priority Data

Jul. 1, 2016  (TW) .............................. 105121081 A

(51) Int. Cl.
  *G01V 1/52* (2006.01)
  *G01V 1/00* (2006.01)
  *G01H 1/00* (2006.01)
  *G01D 5/02* (2006.01)

(52) U.S. Cl.
  CPC .............. *G01V 1/001* (2013.01); *G01D 5/02* (2013.01); *G01H 1/00* (2013.01); *G01V 1/52* (2013.01)

(58) Field of Classification Search
  CPC . G01D 5/02; G01V 1/52; G01V 1/001; G01H 1/00
  USPC .......................................................... 73/652
  See application file for complete search history.

(56) References Cited

U.S. PATENT DOCUMENTS

| | | | | |
|---|---|---|---|---|
| 6,087,936 A | * | 7/2000 | Woods | G01H 11/06 340/429 |
| 6,089,092 A | * | 7/2000 | Shinohara | H01H 35/144 200/61.45 R |
| 6,550,827 B1 | * | 4/2003 | Tsujino | E05B 15/0093 292/252 |
| 6,737,972 B1 | | 5/2004 | Gitlis | |
| 8,023,674 B2 | * | 9/2011 | Schumaier | H04R 25/456 381/312 |
| 8,146,432 B2 | | 4/2012 | Shimase | |
| 2001/0033232 A1 | * | 10/2001 | Chen | G01V 1/008 340/690 |

FOREIGN PATENT DOCUMENTS

| JP | 10025945 | * | 1/1998 |
|---|---|---|---|
| JP | 2006200213 | * | 3/2006 |

\* cited by examiner

*Primary Examiner* — Jacques M Saint Surin
(74) *Attorney, Agent, or Firm* — Rosenberg, Klein & Lee

(57) ABSTRACT

A vibration detection device includes a first component, a second component, and a detecting member. The first component and the second component can be moved with respect to each other. The detecting member is located at one of the first component and the second component and can be moved from a position in response to relative movement between the first component and the second component.

17 Claims, 4 Drawing Sheets

VIBRATION DETECTION DEVICE AND METHOD

FIELD OF THE INVENTION

The present invention relates to a detection device and more particularly to a vibration detection device that works in response to a force.

BACKGROUND OF THE INVENTION

Generally speaking, when a piece of furniture (e.g., a drawer, cabinet, or door) or equipment undergoes an earthquake of a certain magnitude, some moving part or parts of the furniture or equipment tend to move (e.g., open or close) on their own with respect to a stationary part. To prevent accidents that could arise from such unintended operation, safety devices were developed. For example, U.S. Pat. No. 6,550,827 B1 discloses a closing device of a hinged door, wherein the hinged door (32) is provided in a storing device main body (31). The closing device includes a case (33), a locking member (38), and at least one spherical member (37) above the locking member (38). When an earthquake takes place, the spherical member (37) prevents the locking member (38) from moving upward and thereby controls the angle by which the hinged door (32) may be opened by the earthquake.

As furniture or equipment that requires such a safety device varies widely, it is important to develop different products so that consumers are supplied with more choices.

SUMMARY OF THE INVENTION

The present invention relates to a vibration detection device that works in response to a force.

According to one aspect of the present invention, a vibration detection device includes a first component, a second component, and a detecting member. The first component and the second component can be moved with respect to each other. The detecting member is located at one of the first component and the second component and is configured to be moved from a certain position in response to relative movement between the first component and the second component.

Preferably, the second component is movably mounted to the first component.

Preferably, the first component includes a space for receiving the second component.

Preferably, the second component has a smaller size than the space.

Preferably, the vibration detection device further includes a rolling member to facilitate movement of the second component with respect to the first component.

Preferably, the detecting member is a ball.

Preferably, the second component includes a supporting structure for receiving a portion of the detecting member.

Preferably, the supporting structure includes a bottom portion and an inner wall, and the inner wall is tilted with respect to the bottom portion.

Preferably, the first component includes a wall portion adjacent to the supporting structure.

Preferably, the first component and the second component are configured to be moved with respect to each other in a direction different from the direction in which the detecting member is moved from the position.

Preferably, the vibration detection device further includes a cable element by which the second component is suspended from the first component.

Preferably, the cable element is flexible.

According to another aspect of the present invention, a vibration detection device includes a first component, a second component, and a detecting member. The second component is movably mounted to the first component and includes a supporting structure. The supporting structure has a bottom portion and an inner wall. The inner wall is tilted with respect to the bottom portion. The first component includes a wall portion adjacent to the supporting structure. The detecting member is arranged between the supporting structure of the second component and the wall portion of the first component.

According to still another aspect of the present invention, a vibration detection method includes the steps of: providing a first component and a second component that are movable with respect to each other; providing a detecting member between the first component and the second component; and applying a force to one of the first component and the second component such that the detecting member is moved from a certain position in response to the force.

DETAILED DESCRIPTION OF THE INVENTION

Figure 1:
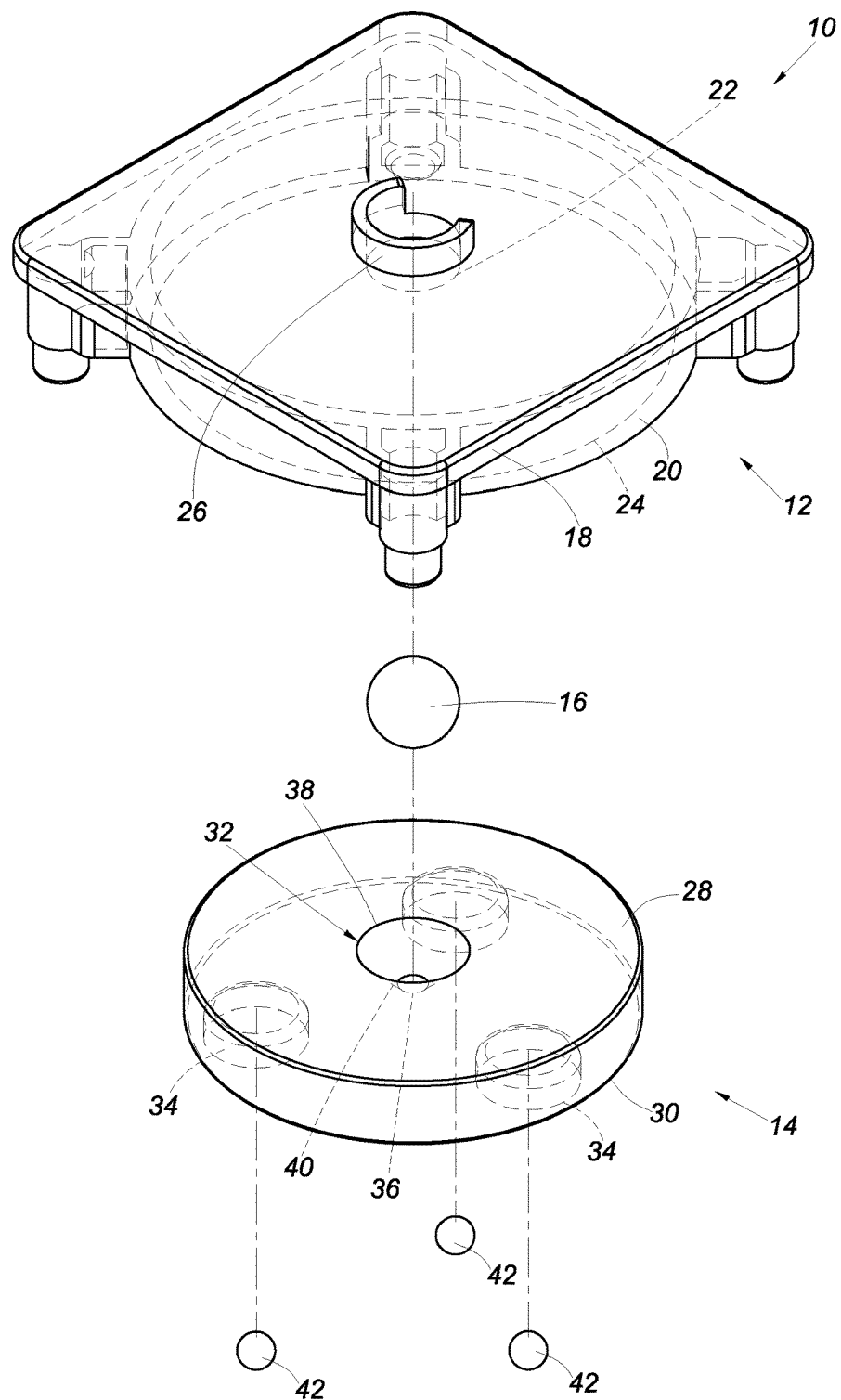
FIG. 1 is an exploded perspective view of the vibration detection device in the first embodiment of the present invention.
Figure 2:
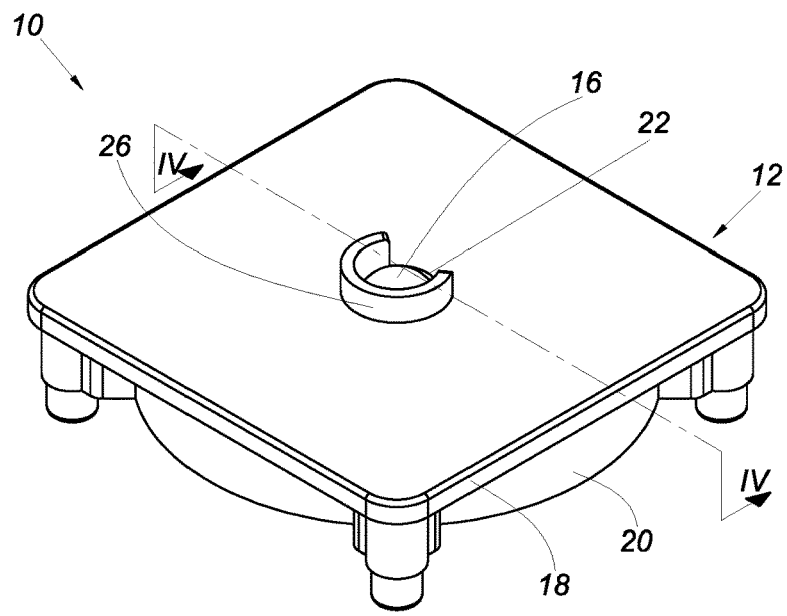
FIG. 2 is an assembled perspective view, taken from the first viewing angle, of the vibration detection device in the first embodiment of the present invention.
Figure 3:
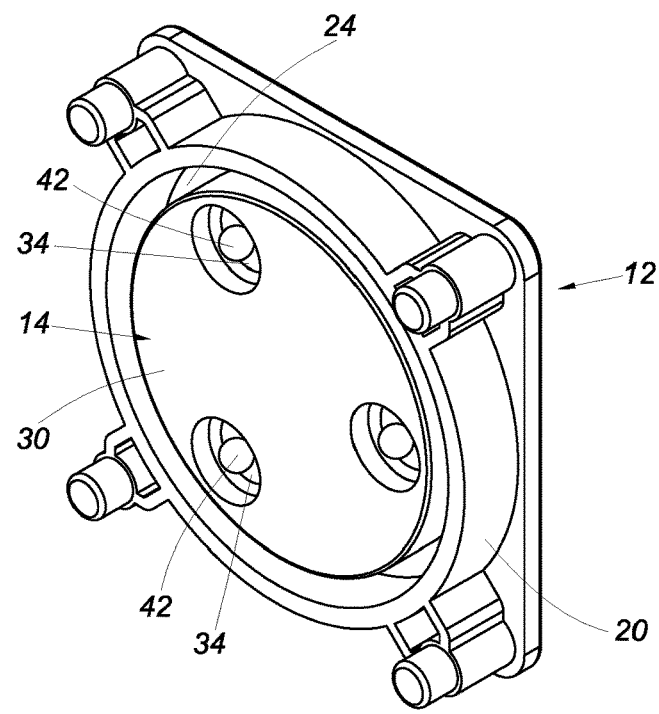
FIG. 3 is an assembled perspective view, taken from the second viewing angle, of the vibration detection device in the first embodiment of the present invention.

Referring to FIG. 1, FIG. 2, and FIG. 3, the vibration detection device 10 in an embodiment of the present invention includes a first component 12, a second component 14, and a detecting member 16.

The first component 12 includes a main body 18 and a position-limiting wall 20. The position-limiting wall 20 is connected to, and located on one side of, the main body 18. The main body 18 has an opening 22, and the position-limiting wall 20 defines a space 24 in communication with the opening 22. Preferably, the first component 12 includes a wall portion 26 located on the opposite side of the main body 18 and adjacent to the opening 22. Here, the wall portion 26 is substantially C-shaped.

The second component 14 is movably mounted to the first component 12. Preferably, the second component 14 is received in the space 24 of the first component 12 and has a smaller size than the space 24. In this embodiment, the second component 14 includes a first side 28 and a second side 30. Preferably, the second side 30 is the opposite side of the first side 28. The second component 14 further includes a supporting structure 32 and a mounting portion 34.

The supporting structure 32 is located at the first side 28 by way of example and substantially corresponds in position to the opening 22 of the first component 12. Here, the supporting structure 32 has a substantially conical shape. More specifically, the supporting structure 32 includes a bottom portion 36, a top portion 38, and an inner wall 40 between the bottom portion 36 and the top portion 38. There is a receiving space between the bottom portion 36 and the inner wall 40. The top portion 38 is wider than the bottom portion 36 and is adjacent to the opening 22 of the first component 12. Moreover, the inner wall 40 is tilted with respect to the bottom portion 36. In this embodiment, the inner wall 40 is an inclined or curved surface with respect to the bottom portion 36.

The mounting portion 34 is located at the second side 30 and may be a sunken area. Preferably, the vibration detection device 10 further includes a rolling member 42, and the rolling member 42 is partially received in the mounting portion 34. The rolling member 42 may be a ball or a roller. In this embodiment, there are a plurality of mounting portions 34 and a plurality of rolling members 42 by way of example.

The detecting member 16 lies between the first component 12 and the second component 14. The detecting member 16 may be a ball or other similar spherical element without limitation.

Figure 4:
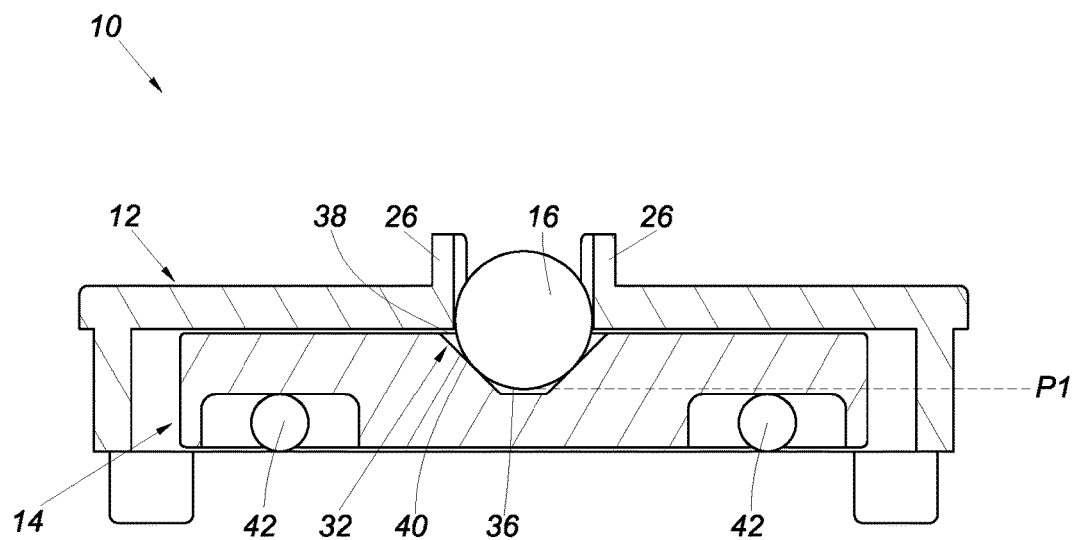
FIG. 4 is a sectional view of the vibration detection device in the first embodiment of the present invention, showing that a force has yet to be applied to the vibration detection device.

As shown in FIG. 4, the wall portion 26 of the first component 12 is adjacent to the periphery of the supporting structure 32. In addition, the detecting member 16 is arranged between the supporting structure 32 of the second component 14 and the wall portion 26 of the first component 12. More specifically, a portion of the detecting member 16 is received in the supporting structure 32 of the second component 14 and is adjacent to the bottom portion 36 of the supporting structure 32. On the other hand, the other portion of the detecting member 16 juts out of the top portion 38 of the supporting structure 32 and is adjacent to the wall portion 26 of the first component 12.

The first component 12 and the second component 14 can be moved with respect to each other. More specifically, it is feasible to fix the first component 12 to an object and allow the second component 14 to be moved with respect to the first component 12. Alternatively, the first component 12 may be movable with respect to the second component 14 while the second component 14 is fixed to an object. Here, by way of example, the first component 12 is fixed, and the second component 14 can be moved with respect to the first component 12.

Figure 5:
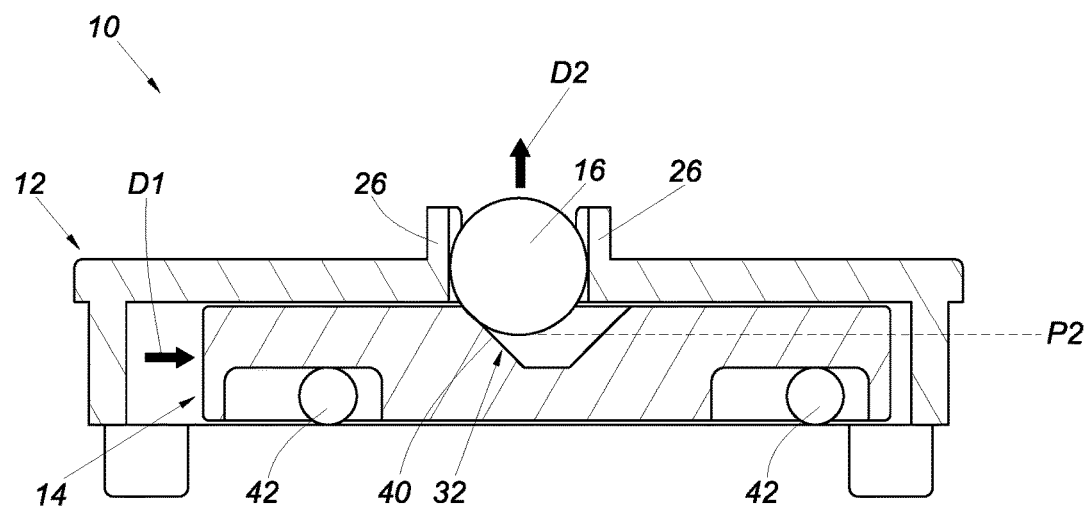
FIG. 5 is another sectional view of the vibration detection device in the first embodiment of the present invention, showing that the vibration detection device is subjected to a force and that the detecting member is driven.

Referring to FIG. 5, when a force such as an externally applied force or the vibrating force of an earthquake is applied to the vibration detection device 10 in a first direction D1, the second component 14 is subjected to the force and is moved with respect to the first component 12 in the first direction D1. The rolling members 42 (which are, for example, in contact with the aforesaid object) make it easier for the second component 14 to move with respect to the first component 12.

Furthermore, the detecting member 16 is moved from a first position P1 to a second position P2 in response to the force. It should be pointed out that the second position P2 is variable with respect to the first position P1, depending on the magnitude of the force. Simply put, the detecting member 16 can leave the first position P1 and reach another position in response to forces (e.g., externally applied forces or vibrating forces) of different magnitudes. More specifically, the detecting member 16 is moved from the first position P1 to the second position P2 in a second direction D2 in response to the second component 14 moving with respect to the first component 12. For example, when the second component 14 is moved in response to the force, the detecting member 16 is pressed against the wall portion 26 of the first component 12 and is driven in the second direction D2 from the first position P1 to the second position P2 by the inner wall 40 of the supporting structure 32 of the second component 14. Please note that the second direction D2 is different from the first direction D1. In other words, the direction in which the second component 14 is moved with respect to the first component 12 is different from the direction in which the detecting member 16 is moved from the first position P1.

Figure 6:
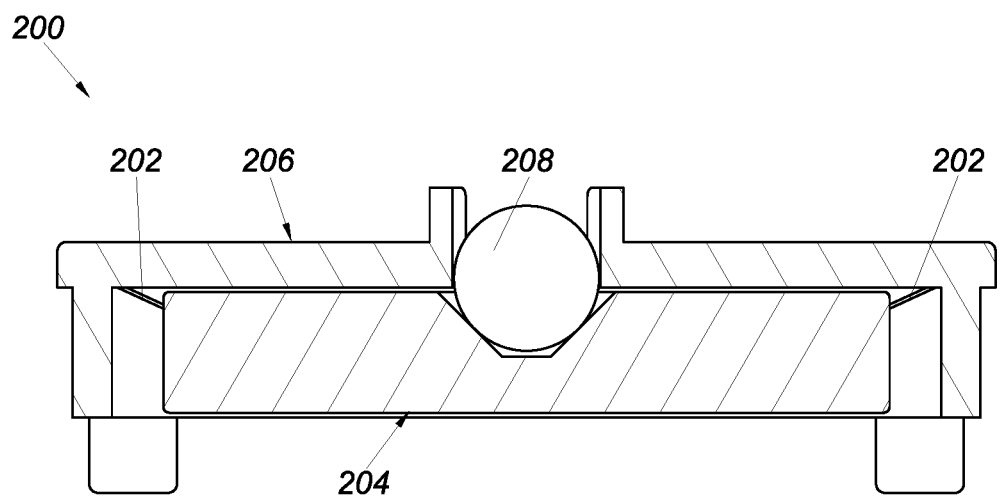
FIG. 6 is a sectional view of the vibration detection device in the second embodiment of the present invention, showing that a force has yet to be applied to the vibration detection device.
Figure 7:
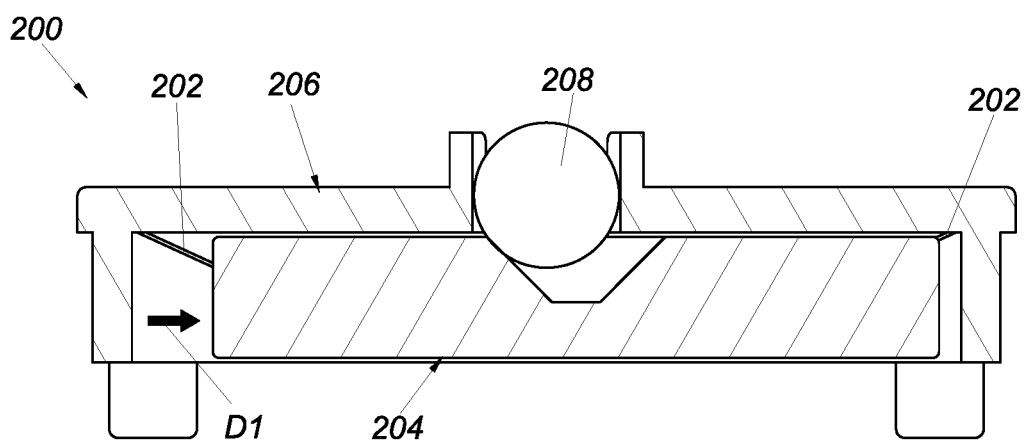
FIG. 7 is another sectional view of the vibration detection device in the second embodiment of the present invention, showing that the vibration detection device is subjected to a force.

FIG. 6 and FIG. 7 show the vibration detection device 200 in another embodiment of the present invention. The vibration detection device 200 is different from the vibration detection device 10 in the previous embodiment generally in that the former includes a flexible cable element 202 such as a spring wire. Here, the second component 204 is suspended from the first component 206 via a plurality of cable elements 202 by way of example. According to this arrangement, the second component 204 is movable with respect to the first component 206 when subjected to a force in the first direction D1, in order to drive the detecting member 208. The working principle of this embodiment is similar to that of the previous embodiment and, for the sake of brevity, will not be stated repeatedly.

In addition, the present invention provides a vibration detection method as disclosed in the embodiments described above. For the sake of brevity, the steps of the method will not be repeated.

While the present invention has been disclosed through the foregoing embodiments, it should be understood that the embodiments are not intended to be restrictive of the invention. The scope of patent protection sought by the applicant is defined by the appended claims.

What is claimed is:

1. A vibration detection device, comprising:
a first component, and a second component movable with respect to the first component, the first component being disposed in overlaying relationship with respect to the second component, the first component having a through opening formed therethrough and a wall portion formed on an outer wall and extending about a peripheral portion of the through opening, the second component having a top surface and a supporting structure formed therein, the supporting structure being defined by a recess having an inclined inner wall; and
a detecting member disposed in the supporting structure of the second component and extending into the through opening of the first component;
wherein the supporting structure is positioned initially in correspondence with the through opening of the first component, and responsive to vibration, the second component is displaced relative to the first component and the inclined inner wall of the supporting structure thereby displaces the detecting member further into the through opening of the first component to contact a surface of the wall portion of the first component.

2. The vibration detection device of claim 1, wherein the first component includes a space for receiving the second component.

3. The vibration detection device of claim 2, wherein the second component has a smaller size than the space.

4. The vibration detection device of claim 1, further comprising a rolling member to facilitate movement of the second component with respect to the first component.

5. The vibration detection device of claim 1, wherein the detecting member is a ball.

6. The vibration detection device of claim 1, wherein the supporting structure further includes a bottom portion, and the inclined inner wall is tilted with respect to the bottom portion.

7. The vibration detection device of claim 1, wherein the second component moves in a direction different from a direction in which the detecting member moves.

8. The vibration detection device of claim 1, further comprising a cable element whereby the second component is suspended from the first component.

9. The vibration detection device of claim 8, wherein the cable element is flexible.

10. A vibration detection device, comprising:
a first component, the first component having a circular through opening formed therethrough and a wall portion formed on an outer wall and extending about a circumferential portion of the circular through opening;
a second component movably mounted to the first component, wherein the first component is disposed in overlaying relationship with respect to the second component, the second component having a top surface and a supporting structure formed therein, the supporting structure being defined by a recess having a conically-inclined inner wall; and
a spherical detecting member disposed in the supporting structure of the second component and extending into the circular through opening of the first component;
wherein the supporting structure has a bottom portion, and the conically-inclined inner wall is tilted with respect to the bottom portion;
wherein the supporting structure is positioned initially in correspondence with the circular through opening of the first component, and responsive to vibration, the second component is displaced relative to the first component and the conically-inclined inner wall of the supporting structure thereby displaces the spherical detecting member further into the circular through opening of the first component to contact a surface of the wall portion of the first component.

11. The vibration detection device of claim 10, wherein the second component is moved with respect to the first component in a direction different from a direction in which the detecting member moves.

12. The vibration detection device of claim 11, wherein the second component and the detecting member move transversely relative to one another.

13. The vibration detection device of claim 10, wherein the first component includes a space for receiving the second component.

14. The vibration detection device of claim 13, wherein the second component has a smaller size than the space.

15. The vibration detection device of claim 10, further comprising a rolling member to facilitate movement of the second component with respect to the first component.

16. The vibration detection device of claim 10, further comprising a cable element whereby the second component is suspended from the first component, wherein the cable element is flexible.

17. A vibration detection method, comprising:
providing a first component, and a second component movable with respect to the first component, the first component being disposed in overlaying relationship with respect to the second component, the first component having a through opening formed therethrough and a wall portion formed on an outer wall and extending about a peripheral portion of the through opening, the second component having a top surface and a supporting structure formed therein, the supporting structure being defined by a recess having an inclined inner wall, wherein the supporting structure is positioned initially in correspondence with the through opening of the first component; and
providing a detecting member disposed in the supporting structure of the second component, wherein the detecting member extends into the through opening of the first component;
wherein responsive to vibration, a force displaces the second component relative to the first component and the inclined inner wall of the supporting structure thereby displaces the detecting member further into the through opening of the first component to contact a surface of the wall portion of the first component.

* * * * *